United States Patent [19]

Werner

[11] 3,874,591
[45] Apr. 1, 1975

[54] EMITTER VALVE FOR SOIL IRRIGATION

[75] Inventor: David Werner, Los Angeles, Calif.

[73] Assignee: Salco Products Incorporated, Los Angeles, Calif.

[22] Filed: Feb. 9, 1973

[21] Appl. No.: 331,128

Related U.S. Application Data

[63] Continuation of Ser. No. 110,714, Jan. 28, 1971, abandoned.

[52] U.S. Cl............... 239/106, 239/542, 239/547, 251/145, 137/525
[51] Int. Cl............................................. B05b 15/00
[58] Field of Search ............ 251/145, 146; 137/525, 137/512.15, 625.3; 239/534, 542, 547, 602, 106; 138/43, 46; 220/44 R

[56] References Cited
UNITED STATES PATENTS

| | | | |
|---|---|---|---|
| 2,236,013 | 3/1941 | Smith | 138/46 |
| 2,598,961 | 6/1952 | Andrus | 138/43 X |
| 2,804,093 | 8/1957 | Scherer | 138/43 X |
| 2,838,072 | 6/1958 | Stomm, Jr. | 138/43 X |
| 3,229,715 | 1/1966 | Walsh | 137/525 |
| 3,237,914 | 3/1966 | Alix | 251/333 X |
| 3,335,964 | 8/1967 | Singleton | 239/542 |
| 3,534,771 | 10/1970 | Eyerdam | 137/525 X |
| 3,547,355 | 12/1970 | Salazar | 137/525 X |
| 3,560,267 | 2/1971 | Guilliams | 220/44 R |
| 3,562,782 | 2/1971 | Zychal | 137/625.3 X |
| 3,693,888 | 9/1972 | Rondas et al. | 239/547 X |

Primary Examiner—William R. Cline
Attorney, Agent, or Firm—Lewis B. Sternfels

[57] ABSTRACT

The emitter valve, which is useful for irrigation of soil, includes a valve body placed intermediate the ends of a supply conduit and provided with a valve head. The head has an inlet connected to the supply conduit and one or more outlets opening to the valve exterior for supply of controlled amounts of water to the soil. Alternately, the inlet comprises the interior of a threaded extension which may be screwed directly into the supply conduit or pipe. A cylindrical cavity, having a diameter greater than the inlet, is formed in the head and communicates with the inlet through a central opening in a flat-bottomed wall at one end of the cavity. A deformable right cylinder is housed in the valve head and has a channelled end positioned against the flat-bottomed end wall. The cylindrical cavity is threaded at its upper end opposite the end wall to receive an adjustable set screw. The set screw has a recessed end which bears against and supports the deformable cylinder to exert a pressure against the cylinder. The cylinder end positioned on the cavity end wall thus presses against the end wall. The cylinder and cylindrical cavity are so dimensioned as to provide a shell-shaped opening therebetween. The end of the cylinder at the cavity end wall is grooved to form channels radiating from the center of the cylinder to its periphery. The cylinder center at its channelled end is, therefore, free of material and is positioned directly above the inlet to form a through and unimpeded flow path for supply water from the inlet to the shell-shaped opening and further to the outlets. Three grooves or channels are preferred to enable maximum support of the cylinder commensurate with an unimpeded flow of water. Thus, the valve outlet and inlet are unobstructed by the deformable cylinder regardless of operational pressures exerted thereon by the set screw except when great set screw pressure is exerted to purposely shut off flow of water. The amount of water released by the valve is determined by the pressure of water in the supply conduit which overcomes the applied pressure of the set screw and cylinder in order to deform the cylinder and to allow water to pass around the cylinder, its grooves, and the shell-shaped opening to the soil.

28 Claims, 12 Drawing Figures

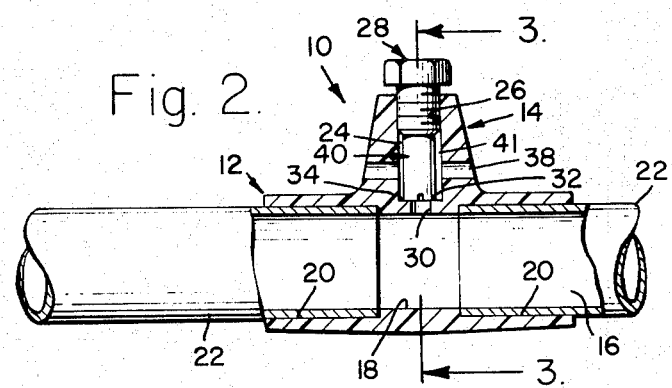
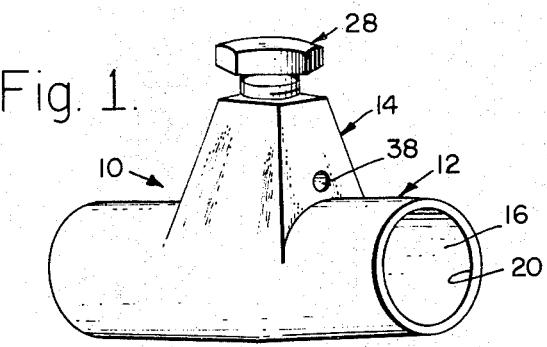
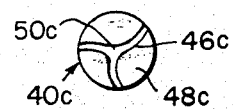
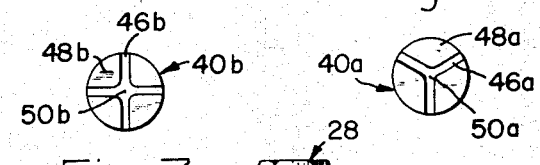
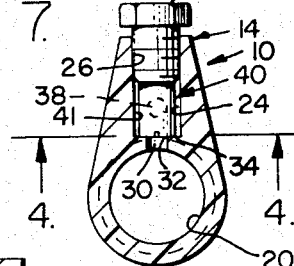
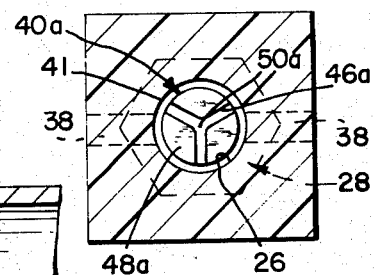
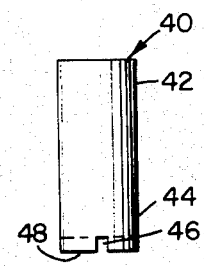
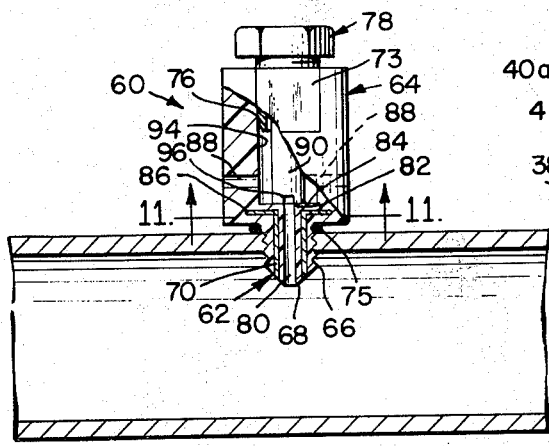
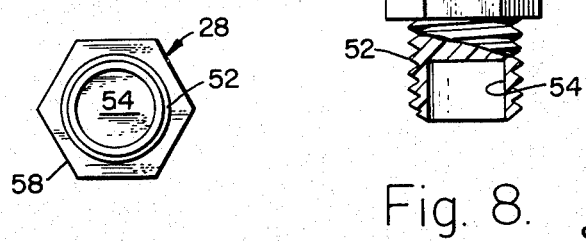

EMITTER VALVE FOR SOIL IRRIGATION

This is a continuation, of application Ser. No. 110,714, filed Jan. 28, 1971 now abandoned.

The present invention relates to a soil irrigation apparatus and, more particularly, to an emitter valve therefor.

Irrigation of soil is an age-old art in which the moisture content of the soil is preferably maintained at levels required by the type of vegetation growing therein. It has also been the aim of irrigation to add to or replenish the soil with various minerals and other nutrients to assure maximum health and proper growth of the vegetation.

The general rule applied with regard to conventional irrigation systems has been simply to furnish the plants with water without regard to their exact moisture requirements or to economical use of water. In many cases, this common practice has actually been detrimental as it degraded the quality of the soil. For example, in desert climates where the soil generally has a large water absorption capability because of the consistently high temperatures and large exposure to the sun, evaporation into the atmosphere and absorption into the soil has required the use of extremely large quantities of water in order to furnish a relatively small amount of water needed by the plant. The majority of water under these conditions filters or percolates through the soil more rapidly than can be used by the plant. This filtration also deleteriously causes salts and other minerals to accumulate and remain in the soil. Evaporation additionally produces the same result and this residue of salts eventually prevents the growth of many forms of vegetation. In one instance, it has been estimated that the Colorado River contains two tons of salts per acre-foot and these salts have seriously polluted the soil, preventing the fullest and most economic use of the soil and the use of the soil for high yield crops.

In addtion, where large volume watering has been undertaken constantly for many years, the water level has actually been raised even in deserts so that the salt level is sufficiently close to the plants to prevent plant growth directly by the salts or indirectly by killing beneficial bacteria which, for example, produce nitrogen needed by the plants.

Because of these problems, such soils at times have been leached, that is, the soil has been washed, in order to drain the salts off into large drainage canals. This leaching method has only met with moderate success and is expensive.

Non-porous soils also experience similar problems and, in addition, water runs off or evaporates into the atmosphere or possibly even rots the plant roots from too much moisture. In such cases, precise metering of water is required.

Prior methods of irrigation have varied from the very old use of wooden planks or bamboo poles to the more modern use of metals and plastics disposed underground as conduits. The major disadvantage of these methods is that the planks or poles soon rot or become clogged with roots, algae, and dirt and even, in the case of bamboo poles, sprout and take root at the knuckles joining the bamboo segments.

In more recent years, metals and plastics have been used for irrigation purposes. One type utilizes spray devices which extend above the surface of the ground from underground piping for sprinkling or "broadcasting" water over the area surrounding the devices. Aside from the problems of acting as obstacles to mowing, harvesting, and other cultivation or gardening techniques, the most serious disadvantage of spray devices is their uneconomic use of water. Excess water either drains from the land or forms pools thereon. On hillsides, this excess water produces seriously eroded soil. In very dry areas, it has been estimated that only five percent of the water reaches the plant, 24 percent of the water being lost to the atmosphere before it reaches the ground, 54 percent evaporating from the surface within the next 36 hours, and the remainder too quickly soaking past the roots before the roots can utilize the water.

Prior devices have also been deficient in the proper control of water flow or supply of water. The water pressure may vary downstream from the source or at different elevations of the outlets. The soil textures may differ from a porous sand to a non-porous clay. Some areas of the land may be shaded while others are exposed to the sun. Furthermore, the conduits may become obstructed by foreign matter such as minerals and algae. In one conduit utilizing uncovered holes, the soil tends to clog the holes or even drop within and plug up the piping. Consequently, after some use of such a conduit, areas of the soil are no longer irrigated. Algae grow within the conduit and produce similar problems. Plant roots also tend to grow toward the source of water to envelop the pipe and grow into the holes so as to provide further clogging.

Several attempts have been made to circumvent these problems, such as by covering the holes with ceramics or foamed plastic pads. These attempts have been unsatisfactory, however, because even such coverings tend to become clogged and fouled. Again, the same problems result, although to a lesser degree, as with the uncovered holes. In addition, algae and minerals are not easily removable from the coverings.

Still another method includes the covering of the holes with a protective material, burying the pipe and material in and surrounding it by a bed of gravel or crushed stone above which a layer of soil is placed. Vegetation is then planted. Although this system minimizes clogging of the holes with soil to some extent, there is still some possibility of roots working their way down through the gravel and into the holes. The greatest drawback to the gravel system, however, is its high cost resulting from the use of special materials, the preparation of the soil, and the high cost of labor.

More recently, an emitter valve disclosed in U.S. Pat. No. 3,547,355 had been devised to overcome the aforementioned problems. Although it has worked well for its intended purpose, its ball element exhibited the tendency to extrude into its inlet and outlet holes under pressure and to become stuck therein, especially during periods of non-use of the valve, thereby preventing the flow of water. Furthermore, minerals and particles in the water supply tended to stick between the ball and other parts of the body further impeding the flow of water.

The present invention overcomes these and other irrigation problems by providing an adjustable emitter valve which can be adapted to different and varying water sources and temperatures, porosities of the soil, elevations of the landscape, shade conditions, temperature conditions, and other factors. In general, the present invention comprises a plastic valve body placed intermediate the ends or at the end of a supply conduit and provided with a head having an inlet connected to the supply conduit. In a modification, the head is threaded directly into the supply conduit through a hole punched or drilled therein. One or more outlets extend from the head. A cavity in the valve head houses a deformable element shaped as a right cylinder, having a diameter larger than that of the inlet. The cavity includes a cylindrical portion, which is of greater diameter than the inlet and the cylindrical element. Thus, a shell-shaped opening exists between the element and the body and directly opens to the outlets. The cylindrical portion terminates in a flat-bottomed wall section for support of the element. The inlet opens into the cylindrical portion through the flat-bottomed wall section.

The cylindrical element is formed with a channelled or grooved end which is adapted to bear against the end wall of the cylindrical portion. The channelled end preferably comprises three grooves, although more grooves may be employed, which radiate from the center of the channelled end to the periphery of the cylindrical element. Thus, the element is so constructed as to open immediately above the inlet and permits direct and unimpeded access to the shell-shaped opening. Three grooves are preferred in order to maximize support of the element on the flat-bottomed end wall of the cylindrical portion. The seating pressure of the cylindrical element against the flat-bottomed wall is varied by means of a set screw, thumb screw or the like threadedly engaging the upper portion of the cavity. The screw is provided with a recessed or countersunk end for contact with and support and enclosure of the end of the element opposite from the channelled end. The length of the screw is so dimensioned as to ensure non-obstruction of the outlet. The element is relatively deformable with respect to the valve body although having substantially similar expansion and contraction characteristics as the body, and resists absorption of water and attack by acids, alkalis, and other chemicals usually found in the soil. In general, the element hardness can vary between 50-80 Shore.

In operation, the amount of water released by the valve is determined by the pressure of water in the conduit which overcomes the pressure of the set screw applied against the element in order to deform the element and to allow water to pass to the soil.

It is, therefore, an object of the present invention to provide an emitter valve for irrigation of soil.

Another object is the provision of such an emitter valve for furnishing metered or controlled amounts of water to the soil.

Another object is to provide an emitter valve in an irrigation system adapted to furnish metered amounts of water to the soil according to varying water conditions and soil porosity, water and environmental temperatures, elevations of the soil, and shade conditions.

Another object is the provision of such an emitter valve having a valve element which is deformable upon application of water supply pressure.

Another object is to provide an emitter valve placeable in a water pipe at any location therein.

Another object is the provision of a novel valve element for an emitter valve.

Other aims and objects, as well as a more complete understanding of the present invention, will become apparant from the following explanation of exemplary embodiments and the accompanying drawings thereof, in which:

FIG. 1 is a perspective view of one embodiment of the present invention;

FIG. 2 is a cross-sectional view of the valve of FIG. 1 with segments of a water supply conduit partly in section connected to the valve;

FIG. 3 is a cross-sectional view of the valve depicted in FIG. 2 taken along lines 3—3 thereof;

FIG. 4 is a slightly enlarged cross-sectional view of the valve shown in FIG. 3 taken along lines 4—4 thereof;

FIG. 5 is an elevational view of the deformable cylindrical element of the present invention;

FIG. 6 is a bottom end view of the element of FIG. 5;

FIG. 6a is a modification of the element shown in FIG. 6;

FIG. 7 is an end view of a modification of the cylindrical element shown in FIG. 5;

FIG. 8 is an elevational view partly in section of the pressure applying screw of the present invention;

FIG. 9 is a bottom view of the screw of FIG. 8;

FIG. 10 is an enlarged elevational view partly in section of a modified embodiment of the present invention; and FIG. 11 is an enlarged end view of the modified valve of FIG. 10 taken along lines 10—10 thereof.

Accordingly, with reference to FIGS. 1-4, an emitter valve 10 comprises a body 12 and a head 14. The body is provided with a through bore 16 which has a tube abutment section 18 and tube receiving sections 20, the diameter of section 18 being smaller than that of sections 20. If the valve forms the end of a conduit, one section 20 may be replaced by a seal or by a wall formed on the end of the valve body during manufacture of the valve. A supply conduit 22 is received in sections 20 and abuts against section 18. The wall thickness and diameters of conduit 22 are preferably adjusted so that a smooth uninterrupted internal flow path is created in the valve body interior. Supply conduit 22 may be welded or otherwise bonded to the valve body to provide a permanently fixed and watertight seal therewith. It is to be understood that other connections between body 12 and conduit 22 may be made as is known in the art. For example, ridged extensions on the body may be provided for insertion within the supply conduit.

Valve head 14 is provided with an interior cavity 24 which has a threaded opening or portion 26 at one end for reception of a set screw 28 or the like therein. An inlet 30 of smaller bore than portion 26 opens into cavity 24 at one end 32 of the inlet. A flat-bottomed end wall 34 terminates portion 26 and joins at its center the inlet at end 32 to provide a fluid path into cavity 24. A pair of outlets or orifices 38 extend from portion 26 of interior cavity 24 to the exterior of the head. The outlets are placed slightly above end wall 34.

A deformable element 40 is shaped as a right cylinder and is disposed for placement within cavity 24. The element has a diameter slightly smaller than that of the cavity to provide a shell-shaped opening 41 therewith. One end 42 of the element (see also FIG. 5) extends beyond and above outlets 38 and into threaded portion 26. The other end 44 of element 40 is grooved to form channels 46 as illustrated in FIGS. 4-7 which define land supports 48. The supports rest and bear against cavity end wall 34. The embodiment of FIGS. 4 and 6 illustrates three channels 46a and three supports 48a while FIG. 7 depicts a modification with four channels 46b and four supports 48b. The channels radiate from the center of the element outwardly to the periphery thereof and form a central opening 50a or 50b which is positioned directly above inlet 30 to provide an unimpeded flow path from bore 16 to outlets 38 through inlet 30, opening 50a or 50b, channels 46a or 46b, and shell-shaped opening 41. Such an unimpeded flow path is desired in order to allow for all water supply conditions such as water carrying soil nutrients, undissolved minerals and other solid particulate matter. Three channels are preferred to provide maximum support of element 40 under all pressures exerted thereon while allowing for the desired flow of water.

In addition, channels 46 may be curved at 46c as shown in the modification of FIG. 6a in order to impart a swirling motion to the water as it enters into and swirls about in shell-shaped opening 41. The swirling not only aids the flow characteristics of the valve but also enables the valve to clean itself.

As best shown in FIGS. 8 and 9, set screw 28 is provided with a threaded end 52 which is disposed for engagement with cavity threaded portion 26. End 52 is recessed or countersunk at 54 for reception of end 42 of element 40. The degree of threading of the set screw into the cavity provides an adjustable pressure on the cylindrical element. At sufficiently high pressures of screw 28 on element 40, the element can be caused to be pressed against end 32 of inlet 30 or to close channels 46 in order to shut off the flow of water. The length of screw 28 is sufficiently short in order not to obstruct outlets 38. Thus, element 40, screw 28, channels 50, shell-shaped opening 41, and portion 26 act together as a regulator. A hexagonal head 58 or similar means is provided on set screw 28 to enable turning of the screw in order to vary the degree of threading engagement between cavity portion 26 and the screw and, as a consequence, to vary the pressure on the element against end wall 34. The pressure provides a counterpressure against the water in supply conduit 22.

Now referring to FIGS. 10 and 11 which depict a modification of the present invention, an emitter valve 60 comprises the same regulator mechanism shown in FIGS. 1–9 with the exception that body 12 has been replaced with a threaded connector 62 to which a head 64 is integrally secured. Connector 62 is provided with threads 66 and with a tapered end 68. In order to impart rigidity to the connector and to prevent the connector from breaking off from head 64, a metallic T-shaped insert 70 is molded into connector 62 and head 64.

The head is adapted to thread into a conduit 72 aided by flat portions 73 engageable by a wrench or the like. The conduit is connected to a supply or source of irrigation water. The attachment between valve 60 and conduit 72 may be accomplished in any convenient manner, such as by punching a hole into the conduit by tapered end 68 or by pre-punching or pre-drilling a hole into the conduit by conventional tools and then threading connector 62 into the hole. A sealing O-ring 75 may be provided around the threaded connector between the valve and the conduit to ensure a further water-tight seal and, in addition, one of several plastic bonding compounds or adhesives may be used to bond the threaded valve to the conduit, as is well-known in the art.

As in the embodiment illustrated in FIGS. 1–9, valve 60 includes an interior cavity 74 having a threaded portion 76 at one end thereof for threaded engagement with a set screw 78. An inlet 80 is provided in connector 62 and T-shaped insert 70 and opens into the cavity at one end 82 of the inlet for supply of water from conduit 72 into the cavity. Inlet end 82 thus joins cavity 74 at a cavity end wall 84. Embedded in valve 60 as by molding is a contiguous plate portion 86 of T-shaped insert 70. Outlets 88 communicate with cavity 74 for exit of water to the soil. A deformable element 90 of the same cylindrical configuration and the same construction as element 40 of FIGS. 5–7 is positioned within head 64 and is caused to bear against end wall 84 by set screw 78 under the pressure exerted thereby. A similar channelling or grooving 96 in the element is provided for the same flow path purposes described above.

Preferably, body 12 and connector 62 and head 14 and 64 are fabricated of a hard plastic such as ABS (acrilonitrite butadine styrene), polyethylene, polypropylene, polyvinyl chloride, styrene, and nylon, while element 40 and 90 is fabricated of a relatively soft material, such as ethylenepropylene terpolymer, known in the industry as EPT or EPDM, such as "Nordel 1470," trademark of E. I. DuPont de Nemours & Co., which has been cured or vulcanized with an organic peroxide to impart the element with such characteristics as being nonporous to water and resistant to acids, alkalis and other chemicals, having high plastic memory and hardness stability through a range of working temperatures, e.g., −40°F to 275°F. The element is further treated during manufacture thereof with a chemical substance which will eliminate the growth, reproduction, and attachment of fungi on the element. Carbon black may also be added to impart further desirable features to the element. The materials of the valve and the element are selected to have substantially similar coefficients of thermal expansion, and the element is provided with a hardness existing preferably at about Shore 70.

In operation, the porosity of the soil, the shade and temperature conditions, the elevations at which the valves are to be placed, and the requirements of the plants for water are determined. The set screw is adjusted in each valve emitter for its specific location and for the water pressure to be used in conduit 22 or 72. Thereafter, no further handling of the valve is required except in those instances where it may be necessary to flush out the system, at which time it is only necessary to increase the water pressure and further deform the element. If desired, the valve may also be opened and, after flushing, the set screw is then readjusted to its former position. Water from conduit 22 or 72 bears against element 40 or 90 and seeps past and swirls about the element and exits through outlets 38 or 88 for supply to the soil.

Although the invention has been described with reference to particular embodiments thereof, it should be realized that various changes and modifications may be made therein without departing from the spirit and scope of the invention.

What is claimed is:

1. An emitter valve for the supply of controlled amounts of water under pressure from a source of water to soil in an irrigation system comprising: a substantially open-ended body having through bore means and a fluid emission and control head;

said bore means connected to the source of water and comprising tube receiving sections and a tube abutment section intermediate said tube receiving sections; and said fluid emission and control head comprising outlet means opening to the exterior of said body, an inlet opening into said bore means for reception of the water under pressure and having a first dimension, and regulator means connecting said outlet means and said inlet, said regulator means comprising:

cylindrical cavity means having a cross-sectional dimension greater than the first dimension of said inlet and communicating with said outlet means, said cavity means including a smooth-walled portion terminating in a flat-bottomed end wall opening into said inlet and a threaded portion extending from said smooth-walled section and opening to the exterior of said body, a deformable right cylindrical element positioned in said cylindrical cavity means and having a cross-sectional dimension slightly less than the cross-sectional dimension of said cylindrical cavity means but greater than the first dimension of said inlet to provide a shell-shaped opening means with said cylindrical cavity means, said outlet means opening into said shell-shaped opening means, and said element having a first flat end and a second end, said second end including at least three arced channel means extending outwardly in a radial manner from the axis of said deformable element to the periphery thereof for providing at least three land supports resting against said flat-bottomed end wall of said cylindrical cavity and for providing an open, self-cleaning unimpeded flow path for the water carrying any solid particulate matter from said inlet into said shell-shaped opening means, said deformable element further exerting a pressure counteracting the pressure of the water, and a screw threadedly engaged within said threaded portion and bearing against said element to adjust the pressure of said element against said cavity end wall, said screw having a countersunk end for reception of said first flat end of said deformable element for support thereof, whereby the pressure exerted by said deformable element and the pressure exerted by the water are so balanced as to permit the supply of controlled amounts of water.

2. An irrigation system comprising:

a source of water for furnishing water under pressure;

an emitter valve for supplying controlled amounts of water carrying solid particulate matter under pressure from said source of water to soil in droplet form;

said emitter valve including fluid inlet means coupled to said source, fluid outlet means opening to the soil, and fluid regulator means including an end wall and joining said outlet means and said inlet means, and flow controlling means coupled to said fluid regulator means, including a deformable element seated on said end wall and including means for swirling the water, and having means for exerting on said element a counterpressure to the water pressure and for permitting substantially unimpeded flow and the supply of controlled amounts of water carrying the solid particulate matter from said source to the soil.

3. An irrigation system as in claim 2 wherein said inlet means includes a bore means, and wherein said deformable element is provided with means for defining openings abutting against and supported by said end wall, said opening means positioned over said inlet portion for permitting the substantially unimpeded flow of the water carrying the solid particulate matter.

4. An irrigation system as in claim 2 wherein said flow controlling means includes a member adjustably connected to said regulator means contacting said deformable element for deforming said deformable element for providing thereby an adjustable pressure on said element for adjusting the supply of the controlled amounts of water.

5. An irrigation system as in claim 2 wherein all components of said regulator means are formed of materials having substantially similar expansion and contraction characteristics.

6. An irrigation system as in claim 2 wherein said end wall is flat and is provided with a central opening therein to form a terminus for said inlet means and wherein said deformable element includes an end resting against said end wall, said element end including means defining a conduit extending from the center of said element to the periphery thereof and an open portion overlying said inlet means at the terminus thereof for permitting the substantially unimpeded flow of the water carrying the solid particulate matter.

7. An irrigation system as in claim 6 wherein said conduit means comprises three channels radiating from the center of said element end for providing the unimpeded flow path from said inlet means to the interior of said regulator means.

8. An irrigation system as in claim 7 wherein said regulator means is provided with means for defining a cylindrically shaped cavity having a diameter of slightly greater dimension than the diametrical dimension of said element for providing therewith a shell-shaped opening means for coupling said inlet means with said outlet means.

9. An irrigation system as in claim 2 wherein said fluid inlet means comprises a threaded connector having opening means therein extending to said deformable element, said connector having a threaded engagement with and through any desired portion of an otherwise normally continuous wall of a supply conduit and coupled to said source of water for positioning of said emitter valve adjacent any portion of the soil requiring irrigation.

10. An irrigation system as in claim 2 further including a conduit having an otherwise imperforate wall and connected to said source of water and wherein said fluid inlet means comprises an extension inserted into and secured to any selected portion of said conduit wall for selectively positioning said emitter valve at any selected part on said conduit.

11. An irrigation system as in claim 10 wherein said extension is provided with external threads for threaded engagement with said conduit wall.

12. An irrigation system as in claim 10 wherein said inlet means includes a bore means, and wherein said deformable element is substantially cylindrical and is provided with means for defining arced openings abutting against and supported by said end wall, said opening means positioned over said bore means for permitting the substantially swirling unimpeded flow of the water carrying the solid particulate matter.

13. An irrigation system as in claim 10 wherein said flow controlling means includes a member adjustably connected to said regulator means contacting said deformable element for deforming said deformable cylindrical element for providing thereby an adjustable pressure on said element for adjusting the supply of the controlled amounts of water.

14. An irrigation system as in claim 10 wherein said end wall is flat and is provided with a central opening therein to form a terminus for said inlet means and wherein said deformable element includes an end resting against said end wall, said element end including means defining a conduit extending from the center of said element to the periphery thereof and an open portion overlying the terminus of said inlet means for permitting the substantially unimpeded flow of the water carrying the solid particulate matter.

15. An irrigation system as in claim 14 wherein said conduit means comprises three channels radiating from the center of said element end for providing the unimpeded flow path from said inlet means to the interior of said regulator means.

16. An irrigation system as in claim 15 wherein said element is substantially cylindrical and said regulator means is provided with means for defining a substantially cylindrically shaped cavity having a diameter of slightly greater dimension than the diametrical dimension of said element for providing therewith a substantially shell-shaped opening means for coupling said inlet means with said outlet means.

17. An irrigation system including an emitter valve for the supply of controlled amounts of water under pressure from a source of water to soil, said emitter valve comprising a fluid emission and control head and including:
outlet means opening to the exterior of said head, inlet means connected to the source for reception of the water under pressure, and regulator means connecting said outlet means with said inlet means, said regulator means comprising a cylindrical portion connecting said inlet means and said outlet means, a deformable cylindrical element including arced conduit means coupled to said inlet means and positioned in said cylindrical portion and exerting a pressure counteracting the pressure of the water, and means engaged within said head and bearing against said element to adjust the pressure of said element whereby the pressure of said element and the pressure of the water are so balanced as to permit the supply of controlled amounts of water, said arced conduit means causing water flowing therethrough to swirl.

18. An irrigation system for supplying controlled amounts of water under pressure from a source of water to soil comprising:
a supply conduit having at least one normally continuous wall portion coupled to said source;
an emitter valve comprising fluid inlet means having connector means inserted into a puncture in said continuous wall of said conduit, fluid outlet means opening to the soil, and fluid regulator means including means defining the terminus of said fluid inlet means and joining said outlet means and said inlet means, and flow controlling means coupled to said fluid regulator means, including a deformable element having means for seating said element on said terminus means and for imparting a swirling motion to the water, and having means for exerting on said element a counterpressure to the water pressure and for permitting substantially unimpeded flow and the supply of controlled amounts of water carrying any solid particulate matter to the soil wherein the puncture in said continuous wall is positioned adjacent the soil where no outlet from said supply conduit had previously existed.

19. An irrigation system as in claim 18 wherein said connector means comprises a body having threads on its exterior and opening means through its interior for enabling the insertion of said emitter valve into said wall of said supply conduit in threaded engagement therewith.

20. An irrigation system as in claim 18 wherein said connector means comprises an extension inserted into the said wall of said conduit and secured thereto.

21. An irrigation system as in claim 20 wherein said extension is provided with threads on its exterior for enabling the insertion into threaded engagement with said wall of said conduit.

22. An irrigation system as in claim 20 wherein said inlet means includes a bore means, and wherein said deformable element comprises a cylindrical element provided with means defining openings abutting against and supported by said termination means, said opening means positioned over said bore means for permitting the substantially unimpeded flow of the water carrying the solid particulate matter.

23. An irrigation system including:
an emitter valve for the supply of controlled amounts of water carrying solid particulate matter under pressure from a source of water to soil;
a conduit having an otherwise uninterrupted wall and secured to said source of water;
said emitter valve comprising a fluid emission and control head including outlet means opening to the exterior of said head, inlet means having an extension inserted through said conduit wall and into said conduit for coupling of said inlet means thereto at any desired portion of said conduit wall and for reception of the water under pressure, and regulator means connecting said outlet means with said inlet means, said regulator means comprising a central portion connecting said inlet means and said outlet means, fluid controlling means coupled to said central portion, including a deformable element positioned in said central portion and having means for swirling the water upon contact therewith, and having means for exerting on said element a pressure counteracting the pressure of the water, and means engaged within said head and bearing against said element for adjusting and balancing the pressure of said element against the pressure of the water for permitting substantially unimpeded flow and the supply of controlled amounts of water carrying the solid particulate matter.

24. An irrigation system as in claim 23 wherein said central portion is configured as a cylindrical portion and said element is configured as a cylindrical element.

25. An emitter valve in an irrigation system for supplying controlled amounts of water under pressure from a source of water to soil comprising:

fluid inlet means including bore means coupled to the source;

fluid outlet means opening to the soil; and fluid regulator means joining said outlet means and said inlet means, and including an end wall at said fluid inlet means and a deformable cylindrical element having opening means abutting against and supported by said end wall and exerting a counterpressure to the water pressure to permit the supply of controlled amounts of water to the soil, said opening means including arced channel means radiating from the center of said element at said fluid inlet means to impart a swirling motion of the water upon passage thereof through said arced channel means.

26. An emitter valve in an irrigation system for supplying controlled amounts of water under pressure from a source of water to soil comprising:

fluid inlet means coupled to the source;

fluid outlet means opening to the soil; and fluid regulator means joining said outlet means and said inlet means, and including a deformable cylindrical element having means bearing against said fluid inlet means for exerting a counterpressure to the water pressure, for permitting substantially unimpeded flow and the supply of controlled amounts of water to the soil regardless of solid particulate matter carried by the water and for swirling the water upon flow thereof through said fluid inlet;

said regulator further including a member provided with an end having means defining a recess therein for receiving one end of said element and for centering said element within said regulator for enhancing the substantially unimpeded flow, said member including means coupling said member to said regulator for enabling said member to deform said deformable cylindrical element for providing thereby an adjustable pressure on said element, and for adjusting the supply of the controlled amounts of water with the substantially unimpeded flow.

27. An emitter valve in an irrigation system for supplying controlled amounts of water under pressure from a source of water to soil comprising:

fluid inlet means coupled to the source;

fluid outlet means opening to the soil; and fluid regulator means coupled to said outlet means, and including a flat end wall with a central opening therein to form a terminus for said inlet means and a deformable cylindrical element seated on said end wall and exerting a counterpressure to the water pressure to permit the supply of controlled amounts of water to the soil, said element including an end portion resting against said end wall overlying said inlet means at the terminus thereof, said end portion comprising arced channels radiating from the center of said element end to provide a swirling unimpeded flow path from said inlet means to the interior of said regulator means.

28. An emitter valve in an irrigation system for supplying controlled amounts of water carrying solid particulate matter under pressure from a source of water to soil comprising:

a conduit coupled to the source of water and having a wall;

fluid inlet means comprising an extension inserted into and secured to said conduit wall;

fluid outlet means opening to the soil; and fluid regulator means joining said outlet means and said inlet means, and including an end wall and flow controlling means coupled to said fluid regulator means, including a deformable cylindrical element having means for defining a seat therefor on said end wall and for enabling the water to swirl upon contact with said seat, and having means exerting on said element a counterpressure to the water pressure and for permitting substantially unimpeded flow and the supply of controlled amounts of water carrying the solid particulate matter to the soil;

said regulator including an adjustable member having means therein defining a recess for receiving one end of said element for contacting and supporting said element, for aiding the substantially unimpeded flow and for deforming said deformable cylindrical element for providing thereby an adjustable pressure on said element for adjusting the supply of the controlled amounts of water carrying the solid particulate matter.

* * * * *